(12) United States Patent
Evans et al.

(10) Patent No.: US 7,316,536 B2
(45) Date of Patent: Jan. 8, 2008

(54) STORAGE SYSTEM WITH ACCESS CONTROL SYSTEM

(75) Inventors: James V Evans, Maple Valley, WA (US); Timothy Robey, Windham, ME (US); Paul Roy, Lewistone, ME (US)

(73) Assignee: Bellheimer Metallwerk GmbH., Bellheim (DE)

( * ) Notice: Subject to any disclaimer, the term of this patent is extended or adjusted under 35 U.S.C. 154(b) by 420 days.

(21) Appl. No.: 10/483,360

(22) PCT Filed: Jul. 10, 2002

(86) PCT No.: PCT/DE02/02569

§ 371 (c)(1),
(2), (4) Date: May 28, 2004

(87) PCT Pub. No.: WO03/006345

PCT Pub. Date: Jan. 23, 2003

(65) Prior Publication Data

US 2004/0208731 A1 Oct. 21, 2004

(30) Foreign Application Priority Data

Jul. 12, 2001 (DE) ................. 101 35 084

(51) Int. Cl.
*B65G 1/00* (2006.01)
(52) U.S. Cl. ..................................... 414/270
(58) Field of Classification Search .............. 414/267, 414/270, 807, 808
See application file for complete search history.

(56) References Cited

U.S. PATENT DOCUMENTS

| | | | | |
|---|---|---|---|---|
| 5,105,069 A | * | 4/1992 | Hakenewerth et al. | 235/379 |
| 5,183,999 A | * | 2/1993 | Hakenewerth et al. | 235/379 |
| 5,599,154 A | * | 2/1997 | Holscher et al. | 414/278 |
| 5,687,858 A | * | 11/1997 | Bouche | 211/121 |
| 5,893,697 A | * | 4/1999 | Zini et al. | 414/273 |
| 6,056,134 A | * | 5/2000 | Katzenschwanz | 211/187 |
| 6,378,324 B1 | * | 4/2002 | Percy et al. | 62/448 |
| 6,450,598 B1 | * | 9/2002 | Hanel | 312/268 |
| 6,756,879 B2 | * | 6/2004 | Shuster | 340/5.73 |
| 6,883,681 B1 | * | 4/2005 | Coughlin et al. | 221/123 |

FOREIGN PATENT DOCUMENTS

| | | |
|---|---|---|
| EP | 1061013 | 12/2000 |
| WO | 0005164 | 2/2000 |

* cited by examiner

*Primary Examiner*—Charles A Fox
(74) *Attorney, Agent, or Firm*—Mark P. Stone

(57) ABSTRACT

The invention relates to a storage system (1) with a storage region (2, 3), in which storage material may be stored, with an access region (16), physically removed from the storage system, in which access to the storage material for deposition or withdrawal of storage material (4) can be achieved, and a transport means (11), by means of which the storage material can be transported between the access region (16) and storage region (2, 3). According to the invention, an unauthorized unauthorised removal of storage material may be prevented, whereby an access control system is provided, by means of which access to the storage material support (6, 7) in the access region (16) is permitted or blocked depending on an access authorization of the user.

21 Claims, 6 Drawing Sheets

STORAGE SYSTEM WITH ACCESS CONTROL SYSTEM

TECHNICAL FIELD

The invention relates to a storage system comprising a storage region, for storing storage articles in at least one storage location, an access region, which is at a separate location from the storage region and is intended for access to the storage articles located in the access region, a conveying means, for transporting the storage articles between the storage location and the access region, and a conveying shaft, in which the conveying means are accommodated such that they can be moved back and forth in a conveying direction and which is arranged between the storage region and the access region, as seen in the conveying direction.

PRIOR ART

A storage system of the generic type is known, for example, from DE 92 13 478U1. This document presents and describes a storage lift in which a computer-controlled charging and removal arrangement is guided in a shaft arranged between two rack columns. The storage articles are mounted on storage-article carriers in the individual racks. The charging and removal arrangement conveys the storage articles from their storage locations in the individual racks to a charging and removal opening and back. The storage articles are stored or retrieved through the charging and removal opening.

During operation of such a storage system, it has proven disadvantageous that the storage articles can be removed, and in some circumstances stolen, by anyone in the region of the charging and removal openings.

DESCRIPTION OF THE INVENTION

In view of the disadvantages described, the object of the present invention is thus to provide a storage system which has a storage region and an access region, at a separate location from the storage region, and also a system for managing the same and in the case of which access to at least one of the storage articles stored is limited.

According to the invention, this object is achieved by an access control system which is assigned to the access region and has a barrier which is designed as an essentially horizontal platform and, in dependence on a user's access authorization code, can be transferred, at least in certain parts, from a blocking state, in which access to the storage articles is blocked, into a release state, in which access to the storage articles is released.

In the case of this solution, the access control system of the storage system according to the invention only releases access to those of the storage articles to which a user can establish proof of access authorization by means of the access authorization code assigned to him/her.

The barrier performs, according to the invention, a double function as a horizontal platform and thus operational surface of the storage system and as part of the access control system of the storage system. In the case of the solution according to the invention, the storage articles are not, as in the case of the conventional storage systems with separate access and storage regions, conveyed into an access region located above the platform. Rather, the access region is arranged beneath the platform. In the case of the storage system which is known from the prior art, a storage region is usually located in place of the access region.

In order to establish a user's access authorization to a storage article, each storage article is assigned a release code, which is then compared, by the access control system, with the user's access authorization code. It is only when the comparison establishes that the user can access the storage article that the access control system releases access to the storage article provided with the corresponding release code.

It is consequently possible, in the case of the solution according to the invention, to restrict misuse of the storage articles as a result of free access for all.

In the case of a fair number of storage systems or storage lifts with separate storage and access regions, the storage articles are stored on storage-article carriers, for example containers or trays, and transported into the access region together with the storage-article carrier. For this purpose, the storage-article carriers may have compartments in which various storage articles are stored separately from one another. If such a storage-carrier is transported into the access region, then it is possible, according to an advantageous configuration, for the storage system to be capable of releasing access only to those compartments or storage articles for which the user, in accordance with the access authorization code, is authorized. Depending on the arrangement of the storage articles or compartments on the storage-article carrier, these individual subregions may be arranged continuously or separately.

A solution for the access control system which is a particularly straightforward design is obtained, then, if the barrier is arranged between the storage articles and the user.

The barrier may also be designed, in particular, as a partition, cover or door, or as a combination of partitions, covers or doors, which is/are closed in the blocking state and open in the release state.

In order to store storage articles of different sizes, it is possible for the storage system, according to an advantageous configuration, to be provided with a size-detection means for detecting the dimensions of the storage article. For example, such a size-detection means can detect and store the height of a storage article as it is stored. In dependence on the dimensions, the storage article is transferred into the access region at a corresponding distance from the barrier. In the case of this configuration, the position of the access region is thus dependent on the size of the storage article to which access is to be released. In the case of this configuration, collisions of the storage article with the barrier are avoided and there is better safeguarding against misuse since only small gaps remain between the storage article and the barrier.

If use is made in the storage system of storage-article carriers in which always a plurality of storage articles, in some circumstances with different access authorizations in each case, are stored in compartments, then it is advantageous if, according to a further configuration, the barrier has a plurality of sub-barriers by means of which in each case one part of the access region can be transferred, in dependence on the access authorization code, from the blocking state into the release state. One sub-barrier is preferably assigned one compartment of a storage-article carrier located in an access position in the access region.

The sub-barriers are advantageously dimensioned such that one sub-barrier or a combination of adjacent sub-barriers blocks precisely one compartment of a storage-article carrier. Adapting the dimensions of the subregions of the barrier to the dimensions of the compartments of the storage-article carriers and/or to the dimensions of the storage articles releases access to precisely that storage article to which access is authorized, without there being any possibility of access to compartments to which access is not authorized.

The sub-barriers may advantageously be designed as flaps which are retained in a pivotable or displaceable manner on the barrier.

In order to render unauthorized access to the storage system generally more difficult, all the openings in the storage system through which access is possible to the interior of the storage system should be closed. Consequently, it should be ensured that, with the barrier released, it is not possible to reach into the interior of the storage system. It should only be possible to access the storage article released. This is achieved, for example, by barriers which terminate flush with the storage-article carrier in the first access position, and only form small gaps, if any at all.

Alongside the first access region which has just been described, it is possible for the storage system, in a further advantageous configuration, to have a further, second access region for the storage articles. This second access region differs in functional terms from the first access region in that it allows access to the storage articles in a second access position essentially without action of the access control system. In spatial terms, the second access region may differ by way of its position being different from the first access region: in the second access region, the storage articles are arranged between the barrier and the user, with the result that the user has essentially free access to the storage articles. Use of the second access region makes it possible to store and retrieve bulky storage articles which, on account of their dimensions, would not fit through the barrier or the sub-barriers.

In the case of a configuration with a second access region, an advantageous development provides an inner barrier, which is assigned to the second access region and is arranged between the second access region and the storage region. This barrier is opened and closed for transportation of the storage articles from the storage region into the second access region as soon as the storage articles are located in the second access position. This barrier blocks an introduction opening through which the storage articles are introduced into the second access region by the conveying means.

The second barrier may be formed by the barrier for the first access region, with the result that the barrier performs a double function in respect of the two access regions. As an alternative, it is also possible to provide, in addition to the barrier of the first blocking region, a second barrier, which can be actuated independently of the first barrier.

In a further configuration, it is possible to provide an outer barrier, which is assigned to the second access region and is arranged between the second access region and the user. By virtue of the outer barrier, access to the interior of the storage system is blocked when the inner barrier is open.

In a further advantageous configuration, the second access region may be operated as a kind of air lock, with the result that, when storage articles are transported between the second access region and the storage region, there is no access at any time to the interior of the storage system. The inner barrier here closes the introduction opening in the storage region while the outer barrier is open.

If, in the case of this configuration, for example a storage-article carrier is transported from the storage region into the access region by the conveying means, then first of all the outer barrier is closed and then the inner barrier is opened, with the result that the storage-article carrier can be transported through the introduction opening into the access region. If the storage-article carrier is located in the access region, the inner barrier is closed and then the outer barrier is opened. In this position, access to the storage-article carrier is then possible, but access to the storage-region interior is blocked by the inner barrier.

For storing storage articles, this operation can be carried out in correspondingly reverse order if the storage article which is to be stored has been set down in the access region. In a further advantageous configuration, it is also possible for the access control system to block access to the storage articles prior to the conveying means accessing the storage articles in the storage region or in the access region. If, for example, it is established that a user is not authorized to remove all the storage articles on a storage-article carrier, then in the case of this configuration the storage system will merely signal the inadequate access authorization to the user, but will not remove the storage articles from the access region or the storage region.

In an alternative, space-saving configuration of the storage system, in the case of which the first and the second access regions coincide in spatial terms and merely differ in functional terms, in respect of the release of the access region, the barrier of the first access region may serve, at the same time, as outer barrier of the second access region. In the case of this configuration, the entire barrier of the first access region can be transferred into the release state in order to release the storage articles.

The construction and the functioning of the invention is explained in more detail hereinbelow with reference to exemplary embodiments.

METHODS OF IMPLEMENTING THE INVENTION

Figure 1:
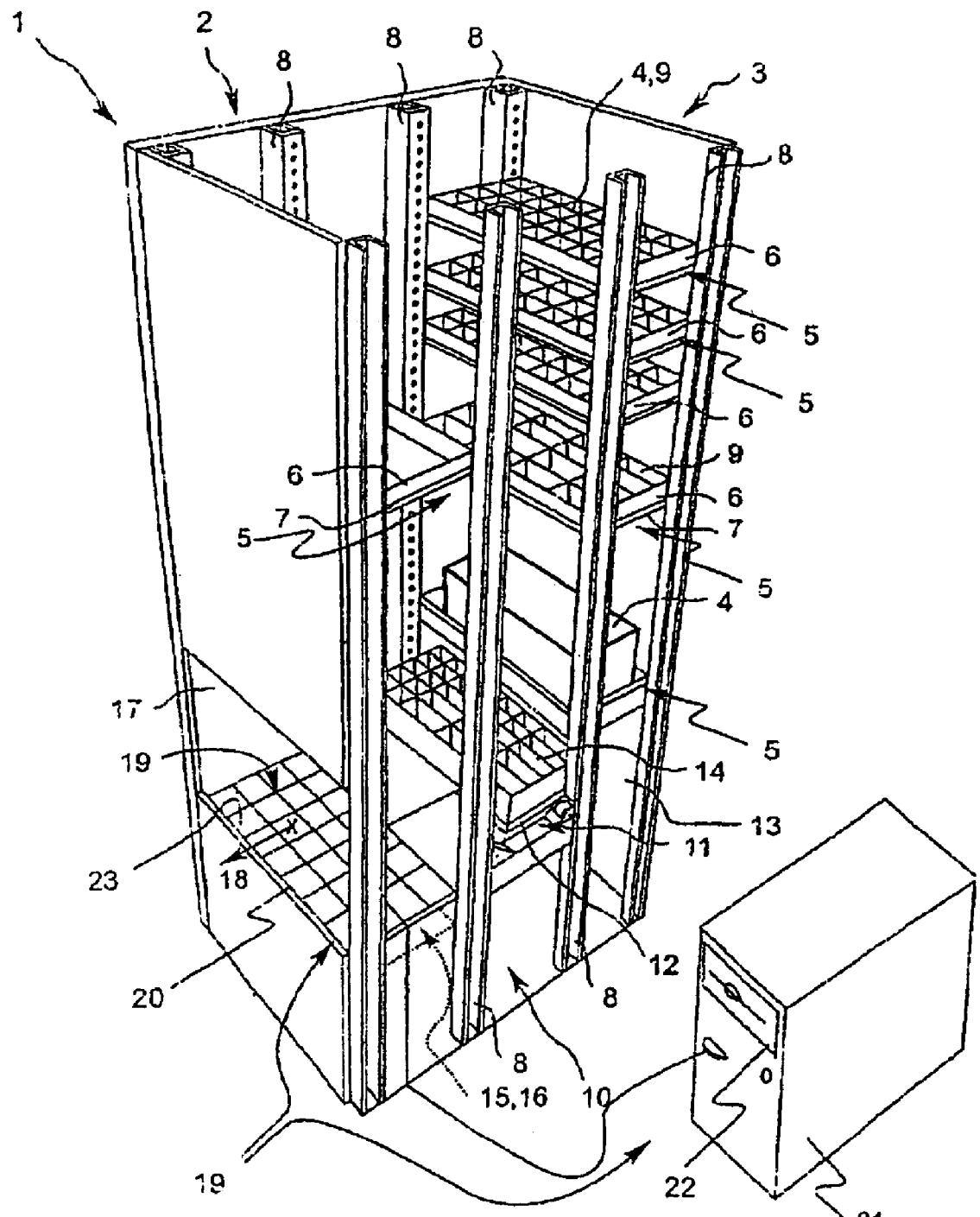
FIG. 1 shows a perspective view of a first exemplary embodiment of a storage system according to the invention.

In the first instance, the construction and functioning of the storage system 1 according to the invention will be described with reference to FIG. 1. In FIG. 1, the side walls which are directed toward the observer have been left out in order to give a view into the interior of the storage system 1.

The storage system 1 has two shaft-like storage regions 2, 3 in the form of rack columns in which storage articles 4 are stored. There are any desired number of storage regions in the storage system. In FIG. 1, the storage regions 2, 3 in the form of a rack column are constructed with stationary storage locations 5 located one above the other in the vertical direction. The storage articles 4 are retained in the respective storage locations 5 of the storage regions 2, 3 by storage-article carriers 6, 7, which are accommodated in corresponding storage frameworks 8. For this purpose, the storage framework 8 forms rail-like retaining means for the storage-article carriers 6, 7 at the respective storage locations 5.

The storage-article carriers 6, 7 may be of different configurations. For example, the storage-article carriers 6 may be provided with compartments 9 in which various storage articles are stored in sorted form in each case. The size and arrangement of the compartments 9 here may differ in dependence on the storage articles stored. Some of the storage-article carriers 6, 7 may also be configured as trays 7, the shape of which corresponds essentially to a platform or a shelf. Storage articles 4 can be set down directly, or in storage-article carriers 6, on the trays 7.

Arranged between the storage regions 2, 3 is a conveying shaft 10 in which a conveying means 11 moves. In the case of the exemplary embodiment of FIG. 1, the storage frameworks 8 which are directed toward the conveying shaft in each case serve, at the same time, as guides for the conveying means 11. The conveying means 11 is thus guided along the storage locations 5—this being essentially upward and downward in the vertical direction in FIG. 1.

The conveying means 11 is equipped with a gripping system (which cannot be seen in FIG. 1), as is known, for example, from the prior art. The conveying means interacts with a storage-article carrier 6, 7 in each case and moves the storage-article carriers from the respective storage location 5 into the conveying shaft 10 and vice versa. The gripping means may be configured, for example, as a circulating finger on the conveying means, which engages in a corresponding finger mount on the storage articles. It is also possible for hydraulically actuated telescopic arms to serve as gripping means. The conveying means 11 together with the gripping system is controlled automatically by a control device (not illustrated).

FIG. 1 shows the storage system 1 in a state in which precisely one storage-article carrier 12 is being drawn out of the associated storage location 13 into the conveying shaft 10 by the conveying means 11. As can be gathered in FIG. 1, the compartments 14 of the storage-article carrier 12 are larger and deeper than those of the storage-article carriers 6, with the result that larger storage articles can be stored in the compartments 14. In order for it to be possible to manage storage articles 4 and storage-article carriers 6, 7, 12 with different sizes, the storage system 1 is equipped with a size-detection means (not shown) which detects at least the height and/or other dimensions of the storage articles 4 and/or of the storage-article carriers 6, 7, 12.

The conveying means 11 transports storage articles 4 or storage-article carriers 6, 7 between the respective storage locations 5 in the storage regions 2, 3 and an access position 15 in an access region 16, which is at a separate location from the storage region 2, 3 and is illustrated schematically by dotted lines in FIG. 1. In the access region 16, it is possible to access the storage articles 4 and/or the storage-article carriers 6, 7 from outside the storage system 1, i.e. to store and retrieve storage articles and storage-article carriers. Access to the storage articles 4 in the access region 16 takes place through the access opening 17 in an access direction 18.

An access control system 19, which is assigned to the access region 16, releases or blocks access to the storage articles in the access region 16 in a controlled manner. For this purpose, the access control system has a barrier 20 which is arranged above the access region 16, that is to say between a user and the access region 16. The barrier 20 serves, at the same time, as a platform of the storage system and prevents unauthorized access to the storage articles 4 in the access region 16. In contrast to conventional storage systems, in the case of the exemplary embodiment of FIG. 1, the access region 16 with the access position 15 for the storage articles is located beneath the platform 20.

As it is being stored, the height of the storage article 4 and/or the storage-article carrier 6, 7 is established and stored by the size-detection means. During retrieval, this information is called up again and the storage article 4 and/or the storage-article carrier 6, 7 is transferred by the conveying means 11 to a corresponding distance beneath the barrier 20, into the access position 15 of the access region 16.

The construction and the functioning of the access control system 19 and of the barrier 20 are explained in more detail hereinbelow:

In addition to the barrier 20, the access control system 19 has a control module 21 with an input unit 22, by means of which a user enters an access authorization code intended for him/her. A user here, in the case of manual access, is understood as being a person who is accessing the storage articles 4 and, in the case of automatic removal systems, as being the respective accessing system, for example a removal robot.

The input unit 22 may be configured, for example, as a card reader for chip cards or magnetic cards, as a keyboard, scanner or as a contactless transponder system.

The access authorization code allows the storage system 1 to establish, via an automatic inventory list which contains in each case the storage location 5 and a release code of the storage articles stored, whether the user is authorized access in each case. For this purpose, the release code which is assigned to the storage articles 3 and the access authorization code which is assigned to the user are compared with one another by the access control system 19. In dependence on the result of this comparison, the access control system 19 will transfer the barrier 20, at least in certain parts, from a blocking state, in which, on account of inadequate access authorization, it is not possible to access the storage articles, into a release state, in which, on account of access authorization being given to the user, it is possible to access the storage articles in the access region 16.

The access authorization and release codes may be staggered hierarchically, with the result that an access authorization with high-level access authorization allows access to the storage articles 4 or storage-article carriers 6, 5 which are provided with a release code of lower-level authorization. In the case of large storage systems or complex storage tasks, it is also possible for a number of access hierarchies to be implemented one beside the other.

In the case of storage-article carriers 6 accommodating a plurality of storage articles, it is possible, in dependence on the access authorization code, for the access control system 19 to limit access to just some of the storage articles 4 in the storage-article carrier 6 when the storage-article carrier 6 is located in the access position 15.

The release of just some storage articles in a storage-article carrier 6 in the access region 16 is described in more detail hereinbelow.

Figure 2:
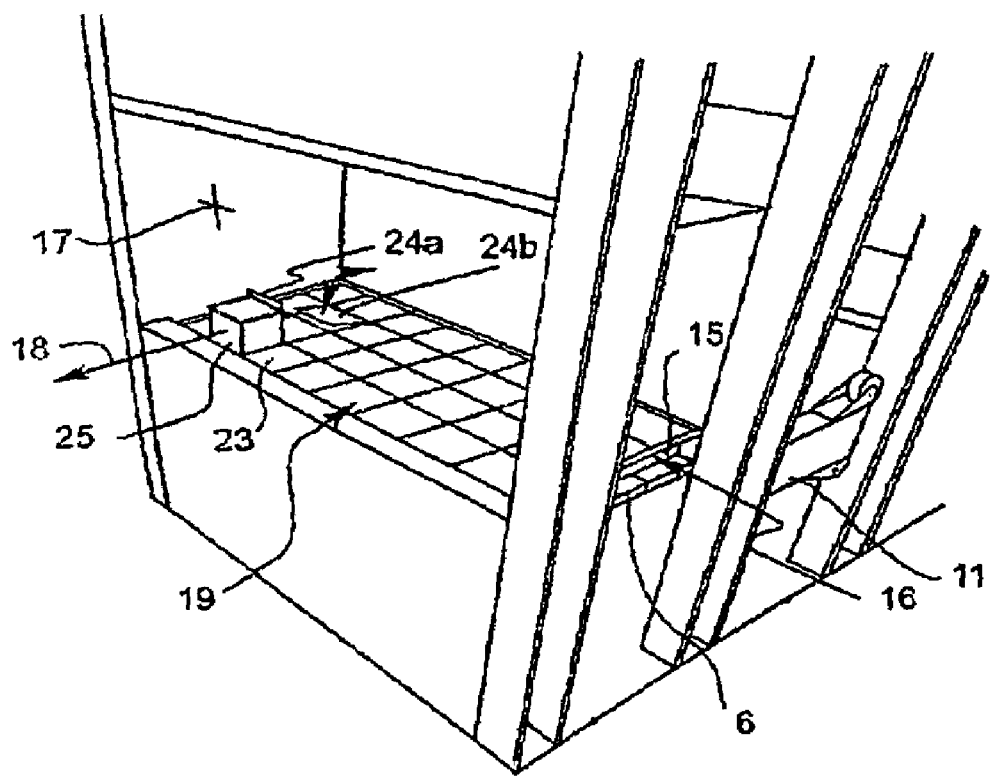
FIG. 2 shows the storage system from FIG. 1 with a storage-article carrier during the removal of storage articles.

In the access position 15 of the access region 16, the storage-article carrier 6 is covered at least in certain parts, and in FIG. 2 completely, by the barrier 20 of the access control system 19, with the result that it is not possible for storage articles 4 to be freely stored and retrieved by bypassing the access control system 19.

In order to allow access just to individual parts of the storage-article carrier 6, the barrier 20 is subdivided into sub-barriers 23. Each sub-barrier 23 is configured as a separately activatable covering element which, in dependence on the access authorization code of the user and on the release code of the storage article, releases or blocks access to the region located therebeneath independently of other sub-barriers. The sub-barriers 23 of the barrier 20 form an area which, altogether, covers one side of the access region. The dimensions of the area correspond approximately to the dimensions of a storage-article carrier. In the exemplary embodiment illustrated, the sub-barriers 23 are configured as flap-like covers which are arranged one beside the other in a number of parallel rows and are separated from one another by crosspieces, in which the pivot bearings of the covers are accommodated.

FIG. 2 illustrates how two sub-barriers 24*a*, 24*b* are opened. The sub-barrier 24*a* is illustrated in the fully swung-open state, for access to a storage article 25, and the sub-barrier 24*b* is illustrated in the partially swung-open state. The sub-barriers are each assigned to the compartments 9 of a storage-article carrier and arranged such that they cover over, to the fullest possible extent, the compartments 9 of a storage-article carrier in the access position.

The dimensions of the compartments 9 and of the region covered by an individual sub-barrier 23 are coordinated with one another, in particular, such that the act of opening a sub-barrier 23 or a combination of adjacent sub-barriers 23 allows access precisely to one compartment 9 in each case or precisely to a combination of adjacent compartments 9 with the same release code in each case. This configuration prevents the situation where, when a sub-barrier 23 is opened, it is possible to access compartments for which the user has no access authorization, but which would otherwise project, in part, into the region released by the sub-barrier 23. The size of a sub-barrier 23 thus corresponds to the size of a compartment 9 or to a whole-numbered multiple of this size.

Figure 3:
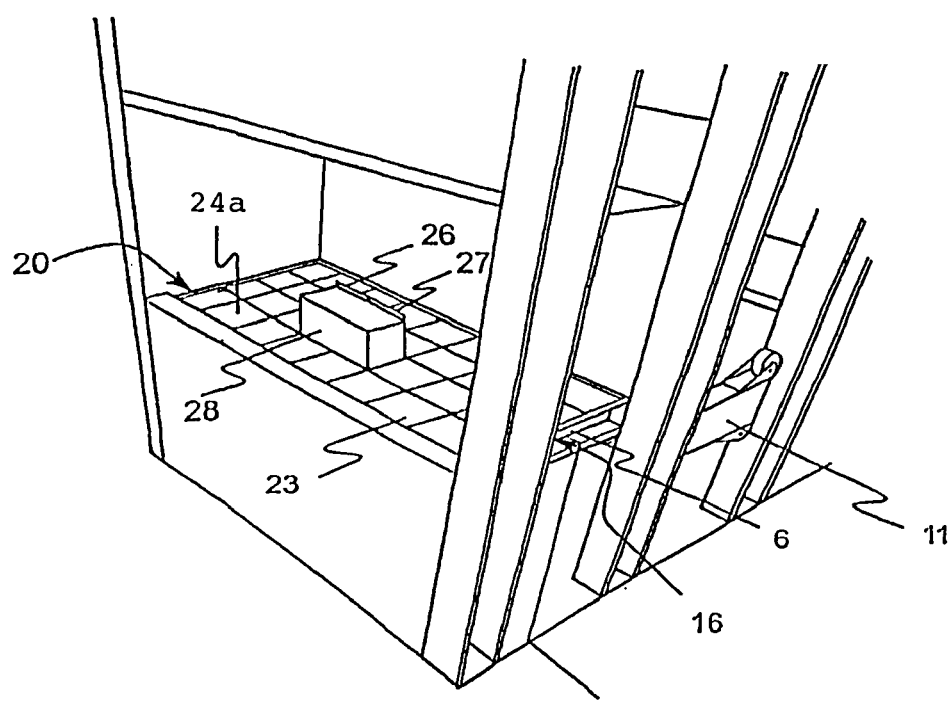
FIG. 3 shows the storage system from FIG. 1 with a storage-article carrier as storage articles are being stored.

FIG. 3 illustrates the storage system 1 and the access control system in a state in which, on account of an access authorization code which is different from FIG. 2, the adjacent sub-barriers 26, 27 have been released. The open sub-barriers 26, 27 give free access to the storage article 28. In contrast to FIG. 2, on account of a different access authorization signal, the sub-barrier 24*a* is blocked in FIG. 3, since, in the case of the operation illustrated in FIG. 3, the user does not have authorization to access the storage article covered by the sub-barrier 23.

As can be gathered in FIG. 3, the storage article 28 which has just been removed is larger than the storage article 25 from FIG. 2. Accordingly, the two adjacent covers 26 and 27 have to be released for access to the storage article 28. In order to prevent access to the adjacent compartments in the storage-article carrier 6 in the access position 15, the size of the region released by the sub-barriers 26, 27 corresponds precisely to the size of the compartment in which the storage article 28 is accommodated.

The access control system 19 can be further secured against manipulation from the outside by the smallest possible gap being present between the compartments 9 and the barrier 20 this gap preventing the removal of storage articles or the manipulation of the barrier through the gap.

Figure 4:
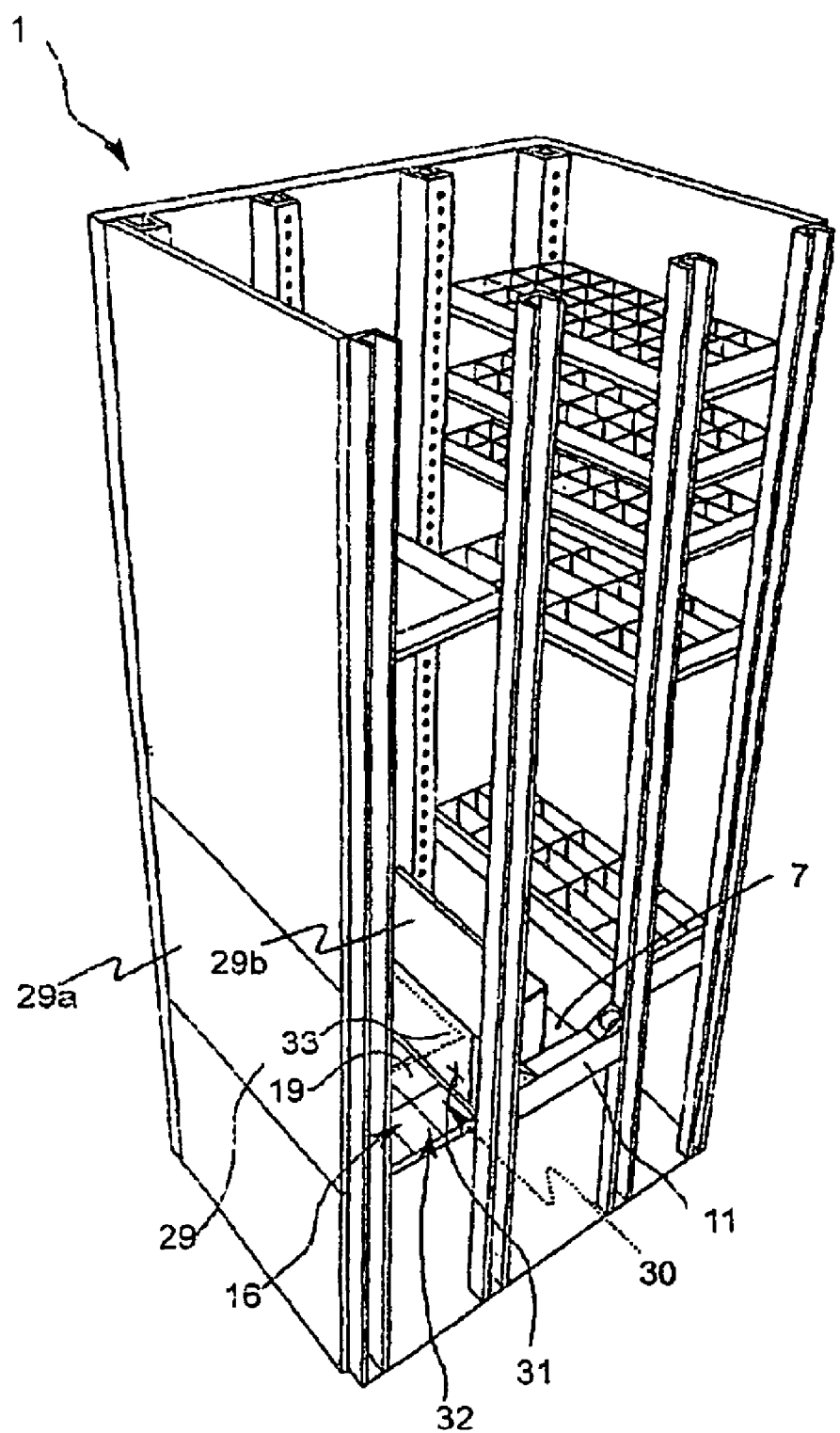
FIG. 4 shows a further exemplary embodiment of a storage system with a second access region and an air-lock-type system.
Figure 5:
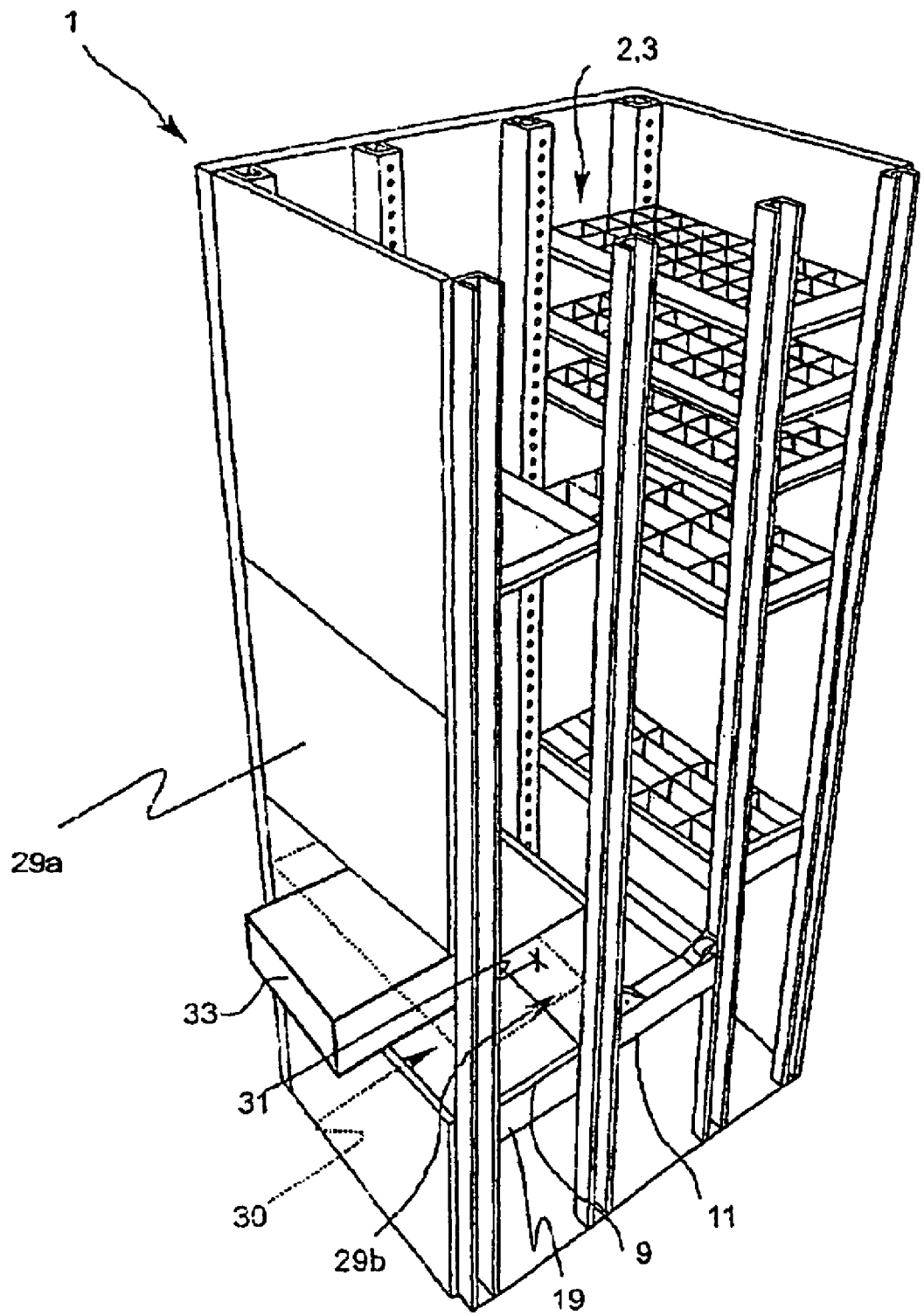
FIG. 5 shoves the storage system from FIG. 4 during the removal of storage articles from the second access position.

FIGS. 4 and 5 illustrate a second exemplary embodiment of the storage system. In the case of FIGS. 4 and 5, elements of which the construction and functioning correspond to the elements of the exemplary embodiment from FIGS. 1 to 3 are provided with the same designations.

In addition to the barrier 20, the exemplary embodiment of FIGS. 4 and 5 is provided with an outer barrier 29*a* and an inner barrier 29*b* and a second access region 30. The second access region 30 is illustrated by dots in FIGS. 4 and 5. The barriers 29*a*, 29*b* interact in the manner of an air-lock-type system and are assigned to the second access region 30. The second access region 30 is located above the barrier 20 and thus allows access to the storage articles without the action of the access control system.

The front or outer barrier 29*a* is configured as a door which can be displaced from top to bottom, transversely to the access direction 18, and essentially in the plane of the access opening 17. The inner barrier 29*b* is arranged on that side of the access region 15 which is directed towards the storage regions 2, 3, and is likewise configured as a sliding door. The barrier 29*b* blocks an introduction opening 31, through which storage articles 4 are transported above the access control system 19, by the conveying means 11, into a second access position 32 in the second access region 30.

The second access region 30 can be used for charging storage-article carriers with storage articles by a user with high-level access authorization or for storing and retrieving bulky storage articles which do not fit through the barrier 20 of the first access region 16.

The operation of retrieving a single bulky article 33 with the aid of the air-lock-type system 29*a*, 29*b*, will now be described with reference to FIGS. 4 and 5.

The single bulky article 33 on the tray 7 is moved from the storage location, by the conveying means 11, into the second access region 16 above the barrier 20.

In order to prevent unauthorized access to the interior of the storage system through the introduction opening 31 during transfer of the single article 33 into the second access region 30, in the first instance the outer barrier 29*a* is moved downward and the access opening 17 is closed. It is only then that the inner barrier 29*b* is moved upward in order to release the introduction opening 31, through which the single article 33 is moved by the conveying means 11 into the second access position 32 within the access region 16.

In order for the single article 33 to be retained securely in the second access position 32 above the barrier 20, corresponding retaining arrangements, for example rails, protrusions or catches, may be provided in the access region 16. The barrier 19 serves as a bearing means on which the single article 33 is set down, with or without a tray 7.

As soon as the single article 33 has reached the second access position, the inner barrier 29*b* is displaced downward and the introduction opening 31 is closed. The outer barrier 29*a* as then opened in order to release access to the single article 33.

Following removal of the single article 33, the operation is carried out in reverse order and the empty tray 7 is transferred once again into the storage region 2, 3 assigned to it: the outer barrier 29*a* closes the access opening 17, whereupon the inner barrier 29*b* releases the introduction opening 31; the conveying means 11 then draws the tray 7 into the conveying shaft 10 and sets down the empty tray 7 in the corresponding storage region 2, 3.

During charging of the storage system 1 with a single bulky article 33, the procedure takes place precisely in the reverse order: the empty tray 7 is moved into the access region 16 with the inner barrier 29*b* open, whereupon the inner barrier 29*b* is blocked, for the purpose of closing the introduction opening 31, and the outer barrier 29*a* is moved upward, for the purpose of opening the access opening 17. The storage article 33 is then positioned on the empty tray 7, the outer barrier 29*a* is displaced downward and the inner barrier 29*b* is then displaced upward. With the outer barrier 29*a* closed, the storage article 33 is then transported into the conveying shaft 10 by the conveying means 11 and set down in a storage region 2, 3.

The operation which has been described above for single bulky articles 33 can also be carried out for a plurality of storage articles which are stored in the storage-article carrier 6. This is described briefly hereinbelow with reference to FIG. 6.

Figure 6:
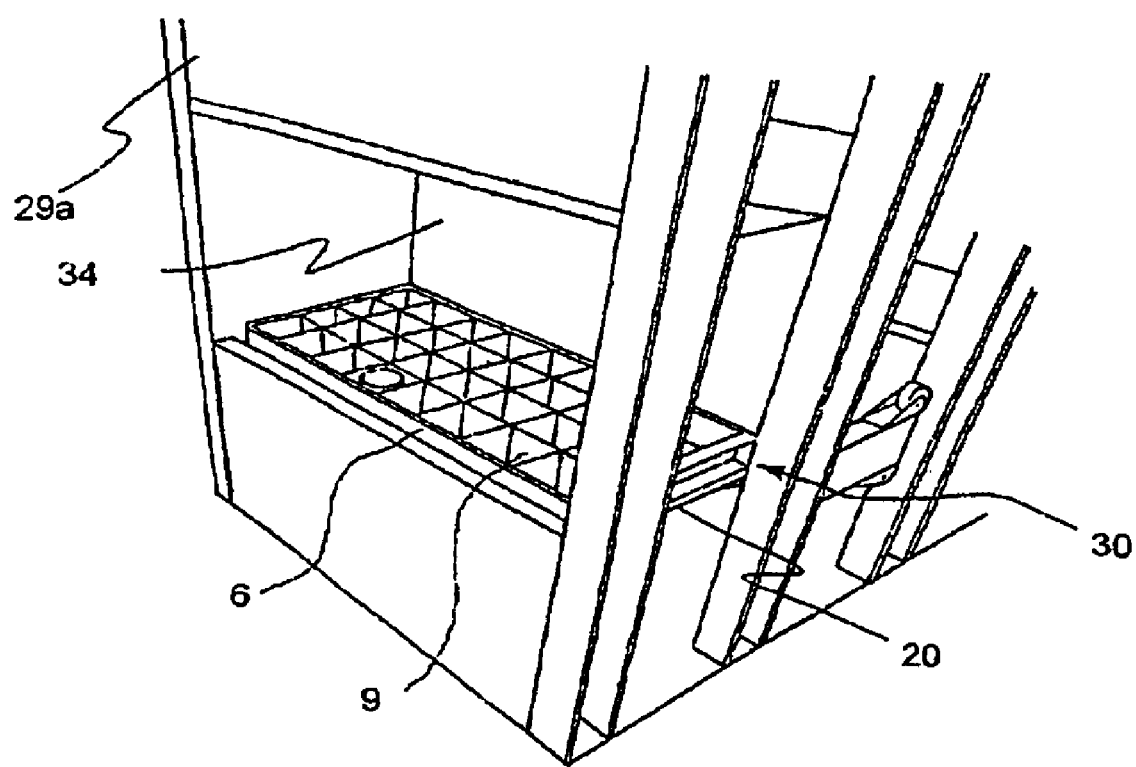
FIG. 6 shows a third exemplary embodiment of the storage system.

FIG. 6 shows a third exemplary embodiment of the storage system. In FIG. 6, elements of which the construction and functioning correspond to the elements of the abovedescribed exemplary embodiments are provided with the same designations.

In contrast to the exemplary embodiments above, the access control system 19 of FIG. 6 is designed as a retrofittable construction kit which has been installed in an existing, conventional storage system 1. For this purpose, fastening means (not shown) are provided on the barrier and cannot be released from the outside following installation, this preventing improper removal of the access control system 19 and/or of the barrier 20.

Furthermore, in contrast to the exemplary embodiment of FIGS. 4 and 5, the storage system 1 of FIG. 6, rather than having an additional inner barrier 29b, merely has an outer barrier 29a. In this exemplary embodiment, the inner barrier 29b is replaced by a fixed wall 34, which is located opposite the access opening 17 of the access region 30. In the case of the exemplary embodiment of FIG. 6, the barrier 20 serves simultaneously as a barrier for the first access region 16 and as an inner barrier for the second access region. In this case, the barrier 20 closes the introduction opening for the second access region as storage articles are transferred into the second access region, and forms the air-lock-type region together with the outer barrier 29a.

In order for the storage-article carrier 6 to be transferred out of the storage region into the position shown in FIG. 6 and back again, the barriers 20 and 29a interact like the barriers 29a and 29b.

The invention claimed is:

1. A storage system (1) comprising a storage region (2, 3), for storing storage articles (4) in at least one storage location (5), an access region (16), which is at a separate location from the storage region (2, 3) and is intended for access to the storage articles located in the access region, a conveying means (11), for transporting the storage articles between the storage location and the access region, and a conveying shaft (10), in which the conveying means (11) is accommodated such that it can be moved back and forth in a conveying direction and which is arranged between the storage region and the access region, as seen in the conveying direction, characterized by an access control system (19) which is assigned to the access region and has a barrier (20) which is designed as an essentially horizontal platform and, in dependence on an access authorization code of a user, can be transferred, at least in certain parts, from a blocking state, in which access to the storage articles is blocked, into a release state, in which access to the storage articles is released, wherein the barrier (20) has a plurality of sub-barriers (23) which can each be transferred, in dependence on the access authorization code, from a release state into a blocking state and by means of which, in the blocking state, in each case part of the access region (16) is blocked.

2. The storage system (1) as claimed in claim 1, wherein the barrier (20), for release of the access region (16), is retained in a moveable manner on the storage system (1).

3. The storage system (1) as claimed in claim 1, wherein one said sub-barrier (23) is assigned in each case to one compartment (9) of a storage article carrier (6) in the access region (16).

4. The storage system (1) as claimed in claim 1 having at least one said storage article carrier (6) provided with at least one compartment (9), wherein the size of the compartment (9) corresponds to the size of the subregion closed by one said sub-barrier (23) or to a whole-numbered multiple of this size.

5. The storage system (1) as claimed in claim 1, wherein the sub-barriers (23) are of essentially flap-like design.

6. The storage system (1) as claimed in claim 1, wherein the storage system (1) has a second access region (30), into which the storage articles (4) can be conveyed by the conveying means (11) during operation.

7. The storage system (1) as claimed in claim 6, wherein the storage articles (4) are retained in the second access region (30) essentially without the action of the access control system (19).

8. The storage system (1) as claimed in claim 7, wherein the barrier (20) is arranged between a first access position (15) and a second access position (32).

9. The storage system (1) as claimed in claim 1, wherein the storage system (1) has a size-detection means which can detect the size of the storage articles (4), and in that the storage articles (4) in the access region (16) are arranged in a size-dependent access position (15).

10. The storage system (1) as claimed in claim 1, wherein the storage locations (5) are arranged in a stationary manner in the storage region.

11. The storage system (1) as claimed in claim 1, wherein the storage region (2, 3) is formed by mutually opposite rack columns, between which the conveying shaft (10) is arranged.

12. The storage system as claimed in claim 1, wherein the storage articles (4) in the access region (16) are retained between the barrier (20) and the user.

13. The storage system as claimed in claim 12, wherein said storage system has a second access region (30) into which the storage articles can be conveyed by the conveying means (11) during operation, the storage articles (4) in the second access region (30) being retained between the barrier (20) and the user.

14. The storage system as claimed in claim 12, wherein said barrier (20) is designed as an essentially horizontal platform.

15. A storage system (1) comprising a storage region (2, 3), for storing storage articles (4) in at least one storage location (5), an access region (16), which is at a separate location from the storage region (2, 3) and is intended for access to the storage articles located in the access region, a conveying means (11), for transporting the storage articles between the storage location and the access region and a conveying shaft (10), in which the conveying means (11) is accommodated such that it can be moved back and forth in a conveying direction and which is arranged between the storage region and the access region, as seen in the conveying direction, characterized by an access control system (19) which is assigned to the access region and has a barrier (20) which is designed as an essentially horizontal platform and in dependence on an access authorization code of a user, can be transferred at least in certain parts, from a blocking state, in which access to the storage articles is blocked, into a release state, in which access to the storage articles is released, wherein the storage system (1) has a second access region (30), into which the storage articles (4) can be conveyed by the conveying means (11) during operation, wherein the storage articles (4) in the second access region (30) are retained between the barrier (20) and the user.

16. The storage system (1) as claimed in claim 15, wherein the barrier (20) is arranged between a first access position (15) and a second access position (32).

17. The storage system (1) as claimed in claim 15, wherein the storage system has an inner barrier (29*b*), which is arranged between the second access region (30) and the storage region.

18. The storage system (1) as claimed in claim 17, wherein the storage system (1) has an outer baffler (29*a*), which is arranged between the user and the second access region (30).

19. The storage system (1) as claimed in claim 15, wherein the storage system (1) has an outer barrier (29*a*), which is arranged between the user and the second access region (30).

20. An access control system (19) for installing in a storage system (1), having a storing region (2, 3), for storing storage articles (4) in at least one storage location (5), having an access region (16), which is at a separate location from the storage region (2, 3) and is intended for access to the storage articles (4) located in the access region, and having a conveying means (11), for transporting the storage articles (4) between the storage location (5) and the access position (15, 32), the access control system (19), in the installed state, being arranged between a user and the storage articles (4) in the access region and having a barrier (20) which can be transferred from a blocking state, in which access to the storage articles (4) is blocked, into a release state, in which access to the storage articles (4) is released, wherein the barrier (20) has a plurality of sub-barriers (23) which can each be transferred, in dependence on an access authorization code of the user, from a release state into a blocking state and by means of which, in the blocking state, in each case part of the access region (16) is blocked.

21. The access control system as claimed in claim 20, wherein said barrier (20) is designed as an essentially horizontal platform.

\* \* \* \* \*

UNITED STATES PATENT AND TRADEMARK OFFICE
CERTIFICATE OF CORRECTION

PATENT NO. : 7,316,536 B2  Page 1 of 1
APPLICATION NO. : 10/483360
DATED : January 8, 2008
INVENTOR(S) : James V. Evans et al.

It is certified that error appears in the above-identified patent and that said Letters Patent is hereby corrected as shown below:

Column 11, Line 9 (Claim 18, Line 2):

Delete "baffler" and substitute --barrier--

Signed and Sealed this

Twentieth Day of May, 2008

JON W. DUDAS
*Director of the United States Patent and Trademark Office*